Dec. 10, 1957  A. E. KOLBE ET AL  2,815,682
CRANKSHAFT
Filed Sept. 29, 1954
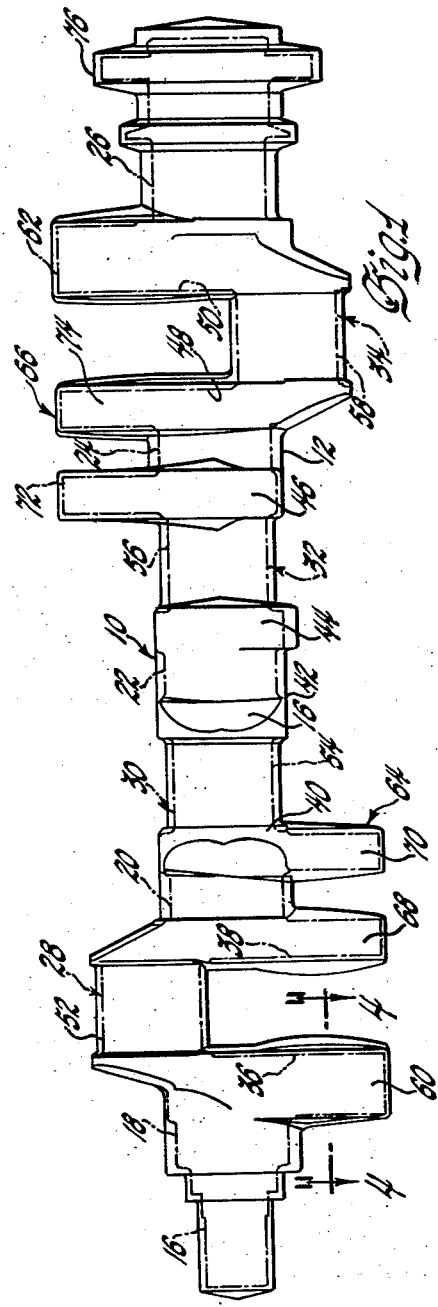
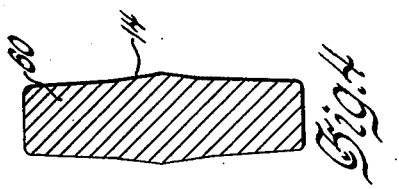
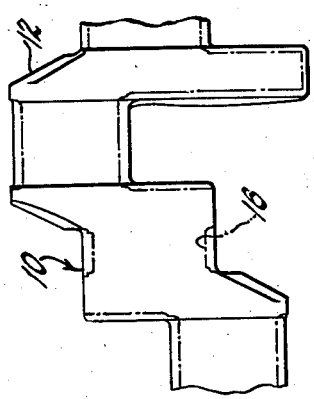
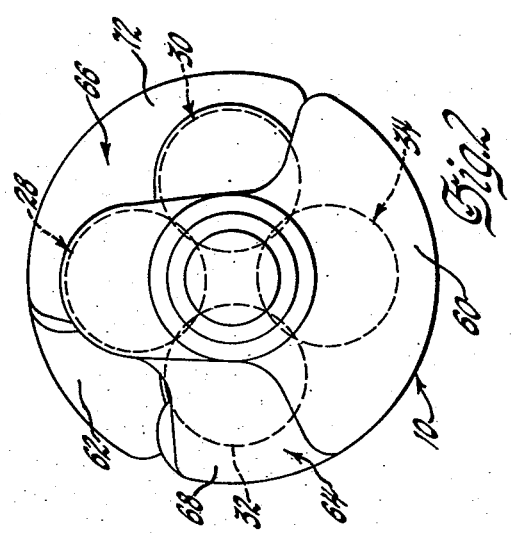
INVENTORS
Adelbert E. Kolbe,
BY Everett B. Sherrick
L. D. Busch
ATTORNEY

United States Patent Office 2,815,682
Patented Dec. 10, 1957

2,815,682

CRANKSHAFT

Adelbert E. Kolbe, Detroit, and Everett B. Sherrick, Pontiac, Mich., assignors to General Motors Corporation, Detroit, Mich., a corporation of Delaware Application September 29, 1954, Serial No. 459,132

3 Claims. (Cl. 74—603)

The present invention relates to internal combustion engines and more particularly to crankshafts therefor.

In order to insure quiet and smooth operation of an internal combustion engine, it is desirable to counterbalance the crankshaft. In so-called 90° V-8 engines, the crankshaft is normally rotatably supported by four main bearings and it employs four throws that are disposed between adjacent bearings. The center pair of throws are in opposition to each other and in quadrature to the pair of end throws which are also in opposition to each other. This neutralizes any secondary rocking couples while the primary rocking couples may be balanced by the use of counterweights. These weights may include a pair of weights disposed on the opposite ends of the crankshaft in the plane of the primary rocking couple and/or a plurality of weights spaced axially along the crankshaft so that a weight will be diametrically opposite each eccentrically disposed mass of the crankshaft. Since there are space limitations and economical factors to be considered, it is preferable to employ as few counterweights as possible. However, a crankshaft is not an absolutely rigid member and accordingly, even though a small number of counterweights may balance the shaft overall, there may be a considerable amount of bending of the intermediate portions of the crankshaft. This bending will cause deflections of the main journals which in turn will produce excessive loads on the bearings with a corresponding excessive wear.

It is now proposed to balance a crankshaft by means of counterweights that are positioned to substantially decrease the bearing loads with a corresponding decrease in the wear thereon. These counterweights may include a pair of eccentrically disposed masses positioned adjacent the opposite ends of the crankshaft. These weights will be disposed on diametrically opposite sides of the crankshaft in the plane of the primary rocking couple. Thus each weight will be in substantially diametrical alignment with the end throws on that end of the crankshaft. In addition, an intermediate weight may be disposed between each end throw and the intermediate throw adjacent thereto. The centroids for each of these weights may lie on a plane intersecting the angle between the end throw and the intermediate throw adjacent thereto. In addition, it has been found desirable to divide the weight into two parts which are disposed symmetrically about an intermediate main journal. Thus each weight will be positioned to most advantageously balance the rocking couple produced by the portion of the crankshaft in and around this intermediate main journal. This will substantially eliminate any unbalanced load being imposed on the intermediate meain bearing, accordingly, greatly reducing the load and resultant wear on this bearing.

In the drawings:

Fig. 1 is a side view of a crankshaft employing the present invention.

Fig. 2 is an end view of the crankshaft of Fig. 1.

Fig. 3 is a plan view of a portion of the crankshaft of Fig. 1.

Fig. 4 is a cross sectional view of one of the rough cast counterbalance weights.

Referring to the drawings in more detail, the present invention may be embodied in any engine crankshaft 10. However, in the present instance, it is particularly adapted for use in a so-called V-type engine having a pair of angularly disposed banks of cylinders with four cylinders in each bank.

The crankshaft 10 may be fabricated from a single integral rough casting or forging. In the present instance the crankshaft 10 is cast as shown by the solid line 12. The various portions of this crankshaft 10 may be provided with a draft angle 14 as shown in Fig. 4 to facilitate the handling of the molds. The rough casting may be machined into the finished shape as shown by the dot-dash lines 16 thus providing the crankshaft 10 with the desired configuration of throws and counterbalance weights. The crankshaft 10 may have a plurality of journals 18, 20, 22, 24 and 26 spaced axially thereon for rotatably supporting the crankshaft 10 in bearings in the engine. In the present instance these journals include a pair of end main journals 18 and 26, a center main journal 22 and a pair of intermediate main journals 20 and 24 disposed between the center 22 and end bearings 18 and 26.

A radial throw 28, 30, 32 and 34 may be provided between each of the journals which will result in a pair of end throws 28 and 34 and a pair of center throws 30 and 32. Each of these throws may include a pair of radial arms 36, 38, 40, 42, 44, 46, 48 and 50 and a connecting rod journal 52, 54, 56 and 58. Each of these journals may be adapted to receive the bearings in the lower ends of a pair of connecting rods that are attached to the pistons in a pair of cylinders disposed on the opposite sides of the engine.

The pair of throws 28 and 34 on the ends of the crankshaft 10 are in diametric opposition to each other while the pair of intermediate throws 30 and 32 are in diametric opposition to each other and in quadrature with the end pair 28 and 34. This disposition of the throws will be effective to dampen out any secondary rocking couples which might otherwise be produced by any unbalance present in the crankshaft.

In order to counterbalance the crankshaft 10 for primary rocking couples, a counterweight 60 and 62 may be provided on each end of the crankshaft 10 on the diametrically opposite sides thereof and in the plane of the primary rocking couples. These weights 60 and 62 may comprise a continuation of the end arm 36 and 50 of the end throws 28 and 34. The end arms 36 and 50 will extend beyond the axis of the crankshaft 10 so as to place the centroids of the counterweights 60 and 62 in the plane of the primary rocking couple which is substantially diametrically opposite the end throws. The adjacent portions of the intermediate throws 30 and 32 will tend to balance out each and the effects of the resultant unbalance will be very small. However, the end weights 60 and 62 may be proportioned to compensate for any unbalance that will occur from this portion of the crankshaft 10.

In addition, a counterweight 64 and 66 may be provided between each of the end throws 28 and 34 and the intermediate throws 30 and 32 adjacent thereto. This counterweight is preferably positioned to counterbalance that component of the rocking couple produced by the portions of the intermediate throws 30 and 32 and end throws 28 and 34 which are adjacent the intermediate journals 20 and 24 and are not balanced by the end weights 60 and 62. In other words these counterweights 64 and 66 will compensate for any primary rocking couple that would otherwise be produced in and around the main intermediate journals 20 and 24. The centroid of each of these weights will produce a component in direct opposition to the unbalance of the throws not otherwise compensated for. Since the force from each throw will be equal in magnitude, the centroid of each weight is preferably disposed in a plane bisecting the angle between the adjacent throws.

It has been found preferable that this weight be divided into two separate and equal parts 68—70 and 72—74 which are disposed on the opposite sides of the intermediate main journals 20 and 24. This will result in the unbalanced forces which the throws produced being balanced at the location of the journals, thus eliminating any rocking couple forces being imposed on the bearings.

The finished crankshaft may be provided with a suitable coupling at the opposite ends thereof for connecting the crankshaft 10 to any desired driving means. In the present instance a flange 76 is provided on one end of the crankshaft for attachment to a flywheel while the other end of the crankshaft is adapted to receive a pulley or gear means for driving the camshaft and engine accessories such as the fan, water pump, etc.

It is therefore apparent that a crankshaft may be provided in which the counterweights are positioned for most effectively balancing out the primary rocking couples and greatly reducing the bearing loads.

It is to be understood that, although the invention has been described with specific reference to a particular embodiment thereof, it is not to be so limited since changes and alterations therein may be made which are within the full intended scope of this invention as defined by the appended claims.

What is claimed is:

1. A crankshaft comprising two pairs of throws, each of said pairs including an end throw and an intermediate throw in quadrature with each other, said end throws being disposed in diametric opposition to each other and said intermediate throws being disposed in diametric opposition to each other, each of said pairs of throws including an intermediate journal disposed between the throws therein and an intermediate counterweight, each of said intermediate counterweights being divided into two equal parts that are disposed on axially opposite sides of said intermediate journal, said parts in each of said pairs of intermediate counterweights being of identical size and radial position for balancing the primary rocking couple produced by those portions of the end and intermediate throws adjacent thereto, and end counterweights disposed on the opposite ends of the crankshaft in diametric opposition to each other and to the adjacent end throw, said end counterweights being of such size and radial disposition as to counterbalance the primary rocking couple not counterbalanced by said intermediate counterweights.

2. The crankshaft of claim 1 wherein the centroids of each of said parts of said intermediate counterweight lie on a plane bisecting the angle between the end and intermediate throws in that pair and the end counterweights are diametrically opposite the end throw adajacent thereto.

3. A crankshaft comprising two pairs of throws, each of said pairs including an end throw and an intermediate throw in quadrature with each other, said end throws being on diametrically opposite sides of said crankshaft from each other and said intermediate throws being on diametrically opposite sides of said crankshaft from each other, each of said throws including a pair of parallel radial arms having a longitudinally extending outer journal disposed between the outer ends thereof, an intermediate main journal disposed between the adjacent arms of each of said intermediate and end throws, intermediate counterweights formed by extending the adjacent arms of the end and intermediate throws radially past the axis of said member so that each of said counterweights will comprise two equal parts whose centroids will lie on a plane bisecting the angle between said adjacent arms and end counterweights formed by extending the end radial arms of the end throws diametrically past the axis of said member so that the centroids thereof will be disposed substantially diametrically opposite the outer journals for the respective end throws.

References Cited in the file of this patent

UNITED STATES PATENTS

Re. 17,549     Chase     Dec. 31, 1929
2,680,387     White et al.     June 8, 1954

OTHER REFERENCES

"Balance of the Cadillac V–63 Engine," by E. W. Seaholm, S. A. E. Journal, pp. 70–73, vol. XIV, No. 1, January 1924.